April 29, 1924.
E. R. HOLMES
1,491,988
FRONT WHEEL DRIVE MECHANISM
Filed Jan. 31, 1920   2 Sheets-Sheet 1
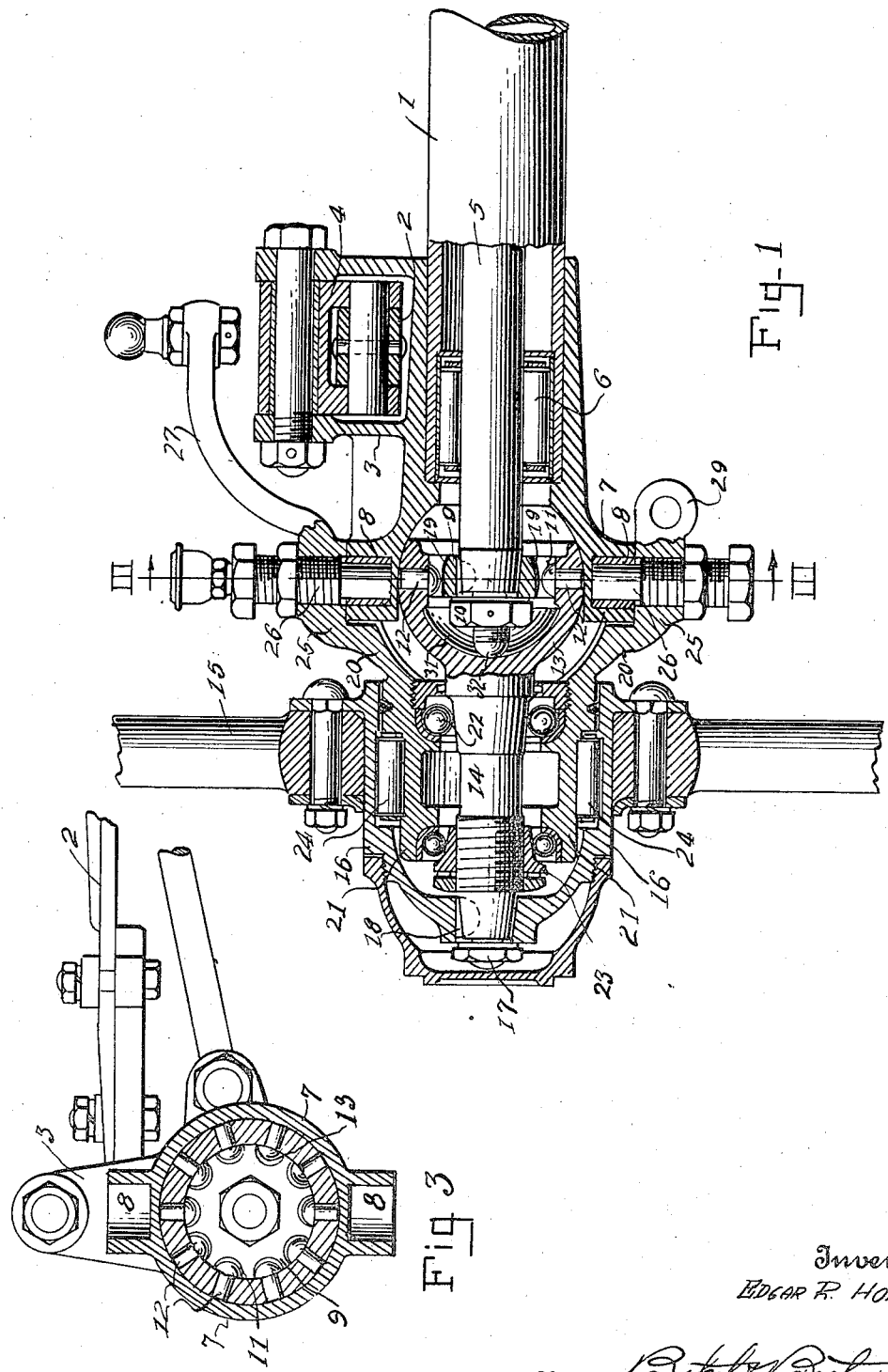
Inventor
EDGAR R. HOLMES
By
Attorneys

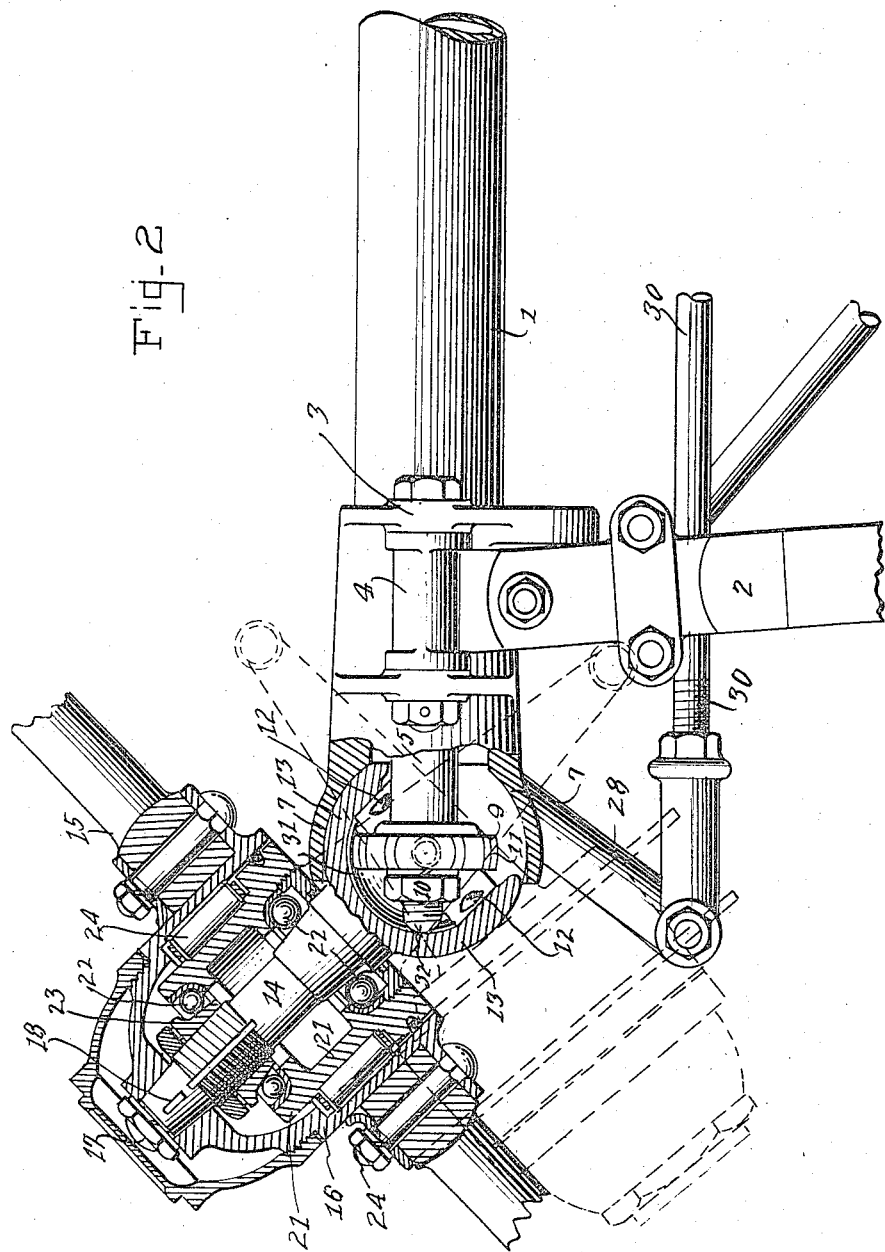

Patented Apr. 29, 1924.

1,491,988

UNITED STATES PATENT OFFICE.

EDGAR R. HOLMES, OF DETROIT, MICHIGAN.

FRONT-WHEEL DRIVE MECHANISM.

Application filed January 31, 1920. Serial No. 355,385.

*To all whom it may concern:*

Be it known that I, EDGAR R. HOLMES, a citizen of the United States of America, residing at Detroit, in the county of Wayne and State of Michigan, have invented certain new and useful Improvements in Front-Wheel Drive Mechanism, of which the following is a specification, reference being had therein to the accompanying drawings.

This invention relates to a front or steering wheel drive and axle for motor vehicles, and its object is to provide a construction which is such as to facilitate assembly of parts and provide a very compact construction which will present a neat appearance and provide a rigid support for the pivotally attached traction or steering wheels.

A further object of the invention is to provide a construction wherein the driving members which connect the driving shaft or live axle and its stub shaft upon which the wheel is mounted, are in driving engagement throughout a wide range of angular adjustment and which provide a driving construction affording a minimum loss of power through angularity of movement. It is also an object of the invention to provide certain other new and useful features in the construction and arrangement of parts all as hereinafter more fully described.

With the above and other ends in view, the invention consists in the matters hereinafter set forth, and more particularly pointed out in the appended claims, reference being had to the accompanying drawings, in which—

Fig. 1 is a vertical longitudinal section through one end of an axle and a wheel attached thereto, illustrative of the invention;

Fig. 2 is a plan view of the same, partly in section, and

Fig. 3 is a transverse section through the end of the axle substantially upon the line III—III of Fig. 1.

As shown in the drawings, 1 indicates a tubular fixed axle to which the supporting spring 2 is attached by means of brackets 3 on the axle and a spring shackle 4 supported by the brackets, in the usual manner. A driving shaft or live axle 5 is carried within the tubular axle 1 concentrically therewith by means of a suitable roller bearing 6 and the end of the tubular axle is formed with a semi-spherical cup 7 formed with sockets 8 at its upper and lower sides in vertical alignment with the axis of the cup.

The end of the live axle extends into the cup 7 and is provided with a toothed driving member 9 secured thereon in any suitable manner, as by a nut 10, upon the screw-threaded end of the axle. This toothed driving member is formed with peripheral teeth 11 to receive between the teeth, pins 12, having semi-spherical inner ends, said pins being carried by a hollow spherical member 13 formed on the inner end of a stub shaft 14 upon which a wheel 15 is mounted to turn therewith, the hollow hub member 16 of said wheel being secured to the outer end of the stub shaft in any suitable manner as by a nut 17 engaging a screw-threaded end of the stub, together with a suitable key 18 for securely locking the hub to the stub shaft.

The pins 12 have reduced portions to engage openings in the spherical head 13 and the semi-spherical heads on these pins project inwardly to engage between the teeth 11 of the toothed member 9, said teeth being formed with their roots or the bottoms of the spaces between the teeth curved transversely of the axle to which the member is secured, to conform to the curved end surface of the semi-spherical heads on the pins and these spaces between the teeth are also curved longitudinally of the axle concentrically with the axis of the ball or spherical head 13 and the socket 7, as shown in Fig. 1 at 19, the outer ends of the teeth 11 being in a like manner curved concentrically with said axis.

Power is thus transmitted from the drive axle 5 to its stub 14 by means of the toothed member 9 on the end of the live axle through the engagement of the pins 12 therewith, which are carried by the hollow spherical head or ball 13 on the inner end of the stub shaft.

A yoke member 20 has a tubular portion or sleeve 21 extending into the hollow hub 16 of the wheel between said hub and the stub shaft 14. Suitable ball bearings 22 are interposed between the stub and the tubular support 21, which ball bearings are made adjustable in the usual manner, by an adjusting cone 23. Interposed between the outer surface of the tubular supporting member 21 of the yoke 20, and the inner surface of the hub 16, is a roller bearing 24 and therefore the yoke provides a rigid support extending into the interior of the hub and the wheel turns freely thereon and is driven by the stub shaft 14 extending therethrough.

Upper and lower arms 25 on the yoke member are provided with interiorly screw-threaded openings or eyes to receive screw-threaded spindles 26, which are screwed into the eyes with their inner ends engaging the cups or sockets 8 which are formed integral with the semi-spherical cup or socket 7 on the end of the tubular axle 1. These arms 25, with their spindles 26 engaging the sockets 8 form a steering knuckle connection between the yoke 20 and the end of the fixed axle 1 and the vertical axis of the spindles 26 passes through the common axis of the ball 13 and cup 7. The steering hub is thus pivotally attached to the end of the fixed axle 1 to turn about a vertical axis in steering the vehicle and is rigidly attached to the end of said axle against lateral tilting movement. The turning of the wheel in steering, is effected through means of a steering arm 27 integral with the upper arm 25 of the yoke and the wheels on opposite ends of the axle are connected for simultaneous turning movement by means of an arm 28 secured in a socket or eye 29 on the lower arm 25 of the yoke and a connecting rod 30 connecting the forward ends of the arms 28 in the usual manner.

It will be noted that there are a plurality of driving pins 12, one for each space between the teeth 11 of the driving member 9 and that said teeth are cut in the periphery of the driving member at short intervals throughout its entire periphery. The member 9 is thus in the nature of a gear wheel which is in mesh with the pins which form an internal gear, but the heads of the pins being semi-spherical and the roots of the teeth being cut upon a radius struck from the axis of the head 13, permits of a free lateral or forwardly and rearwardly turning movement of the stub 14 relative to its driving axle 5. This turning movement, however, cannot at any time disengage the pins 12 from between the teeth of the driving member 9 and because of the number of teeth and pins and their arrangement, there is always a plurality of pins both at the top and bottom sides of the driving connection in engagement with the driving member 9, and thus a very strong and rigid driving connection is secured which is not subject to excessive wear and not liable to get out of order, thus eliminating lost motion between the driving and driven members.

It will be noticed that the inner surface 31 of the ball 13 is formed concentric with its outer surface and that the end 32 of the shaft 5 which projects through the driving member 9, is rounded to engage this surface 31. Therefore, end play or thrust between the driving shaft 5 and its driven stub shaft 14 is taken up by this engagement of the driving shaft with the interior of the ball.

The parts are quickly assembled by reason of the construction set forth, it being only necessary to take out the spindles 26, thus disconnecting the yoke 20 from the end of the fixed axle 1, when the wheel, together with the stub axle 14 may be pulled off, the ball 13 slipping freely out of the socket 7 and the pins 12 coming out of engagement from between the teeth of the member 9 endwise thereof. When the parts are assembled with the spindles in place, they securely hold the ball head 13 in its socket 7 with their common axis in coincidence with the radial center upon which the teeth of the driving member 9 are cut. The yoke 20, with its tubular portion 21, which extends into the wheel hub, forms a very rigid and true support for the wheel bearings so that the wheel will always run true and have a rigid connection with the fixed axle 1 while being free to turn upon its support and being driven by the stub axle extending therethrough.

Obviously changes may be made in the construction and arrangement of parts within the scope of the appended claims, without departing from the spirit of the invention and I do not therefore limit myself to the particular construction shown.

Having thus fully described my invention what I claim is:

1. The combination with a tubular fixed axle, of a semi-spherical socket member on the end of the tubular axle, a stub axle, a hollow spherical head on the stub axle having an opening in the side thereof opposite said stub axle and fitting within the socket member to turn therein, said head forming a closure for said socket in all angular positions of said stub axle relative to said tubular fixed axle and said socket member forming a bearing for said spherical head, a live axle in said tubular axle with one end of said live axle projecting into said spherical head through the opening therein, and a toothed member rigidly secured to the end of said live axle at the axis of said spherical head and having operative engagement with said head to transmit rotary motion thereto at any angle of said stub axle relative to said live axle and toothed member thereon.

2. The combination of a tubular fixed axle having an integral semi-spherical socket at its end, a wheel member, a yoke member pivotally connected to the end of the tubular axle and upon which yoke member said wheel member is mounted to turn freely, and means for transmitting driving power to said wheel member comprising a live axle within the tubular axle, a stub axle to the outer end of which said wheel member is secured, a semi-spherical socket on the end of the tubular axle, a spherical head on the end of the stub axle and having an opening through which the end of the live axle projects into said head, said socket member forming a bearing for the spherical head in all angular positions of said stub axle relative to said tubular axle to support and hold the same in axial alignment with said axle, and a toothed member rigidly secured to the end of the live axle within and at the axis of said spherical head and having operative engagement with said head to turn the same when in any angular relation to said live axle and toothed member thereon.

In testimony whereof I affix my signature in the presence of two witnesses.

EDGAR R. HOLMES.

Witnesses:
FRANK B. HAMLIN,
GEO. C. ROSSELL, JR.